(12) United States Patent
Breuer et al.

(10) Patent No.: US 9,333,852 B2
(45) Date of Patent: May 10, 2016

(54) MISFUELLING PREVENTION DEVICE

(71) Applicant: Volkswagen Aktiengesellschaft, Wolfsburg (DE)

(72) Inventors: Thorsten Breuer, Osnabrueck (DE); Christian Scharping, Tuelau (DE); Hilmar Schichlein, Bonn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 365 days.

(21) Appl. No.: 13/625,258

(22) Filed: Sep. 24, 2012

(65) Prior Publication Data

US 2013/0074987 A1 Mar. 28, 2013

(30) Foreign Application Priority Data

Sep. 24, 2011 (DE) .................... DE10 2011 114 330

(51) Int. Cl.
*B60K 15/04* (2006.01)
(52) U.S. Cl.
CPC ......... *B60K 15/04* (2013.01); *B60K 2015/0483* (2013.01)
(58) Field of Classification Search
CPC . B60K 2015/0483; B60K 15/04; B67D 7/344
USPC .............................. 141/390, 311 R; 220/4.14
See application file for complete search history.

(56) References Cited

U.S. PATENT DOCUMENTS

| 6,923,226 | B2 * | 8/2005 | Bartlett | 141/390 |
| 6,966,349 | B1 * | 11/2005 | Laduke | 141/367 |
| 2002/0088801 | A1 * | 7/2002 | Temmesfeld | 220/86.2 |
| 2009/0145516 | A1 * | 6/2009 | Wells et al. | 141/367 |
| 2011/0108563 | A1 | 5/2011 | Gerdes | |
| 2011/0315682 | A1 * | 12/2011 | Tsiberidis | 220/86.2 |

FOREIGN PATENT DOCUMENTS

| DE | 100 51 847 A1 | 8/2002 | | |
| DE | 101 27 751 A1 | 12/2002 | | |
| DE | 101 39 665 A1 | 2/2003 | | |
| DE | 102005024056 A1 * | 6/2006 | | |
| DE | 10 2008 027 462 A1 | 12/2009 | | |
| DE | 10 2008 040 715 A1 | 2/2010 | | |
| DE | 10 2009 049 482 A1 | 6/2011 | | |
| DE | 202013008280 U1 * | 10/2013 | ............. | B60K 15/04 |
| EP | 2 276 644 B1 | 7/2012 | | |
| WO | WO 2007/091079 | * 8/2007 | | |
| WO | WO 2008059228 A1 * | 5/2008 | ............. | B60K 15/04 |

* cited by examiner

*Primary Examiner* — Mark A Laurenzi
*Assistant Examiner* — Andrew St Clair
(74) *Attorney, Agent, or Firm* — Muncy, Geissler, Olds & Lowe, P.C.

(57) ABSTRACT

A misfuelling prevention device, a fuel tank and a vehicle are described. The misfuelling prevention device includes an elongated support element arranged inside a tubular element. A first end of the elongated support element is coupled to the tubular element and a second end of the elongated support element and a central section of the elongated support element are arranged such that they are spaced apart from an inner surface of the tubular element. A blocking element is arranged at the second end of the elongated support element, thereby preventing misfuelling.

12 Claims, 2 Drawing Sheets

MISFUELLING PREVENTION DEVICE

This nonprovisional application claims priority under 35 U.S.C. §119(a) to German Patent Application No. DE 10 2011 114 330.4, which was filed in Germany on Sep. 24, 2011, and which is herein incorporated by reference.

BACKGROUND OF THE INVENTION

1. Field of the Invention

The present invention relates to a misfuelling prevention device, a fuel tank comprising a misfuelling prevention device and a vehicle.

2. Description of the Background Art

In vehicles like automobiles, passenger vehicles or commercial vehicles, commonly either a gasoline engine or a Diesel engine are used for propelling the vehicle. The vehicles comprise a fuel tank for providing the engine with gasoline fuel or Diesel fuel, respectively. The fuel tank may be refuelled by a user of a vehicle at a filling station. However, care has to be taken that the correct kind of fuel is filled into the fuel tank, as a Diesel engine may be damaged when being operated with gasoline and a gasoline engine may be damaged when being operated with Diesel. Filling the wrong type of fuel into the fuel tank is typically called "misfuelling". Even if a misfuelling has been recognized by the user before starting the engine, substantial cost may arise for removing the wrong kind of fuel from the fuelling system and the fuel tank of the vehicle. For preventing that a fuel tank of a gasoline engine vehicle is fuelled with Diesel fuel, an outer diameter of a filling pipe of a Diesel pump nozzle is larger than an outer diameter of a filling pipe of a gasoline pump nozzle. A filler neck of a vehicle with a gasoline engine has an inner diameter which is smaller than the outer diameter of the filling pipe of the Diesel pump nozzle and large enough that the filling pipe of the gasoline pump nozzle can be inserted. Therefore, inserting the filling pipe of the Diesel pump nozzle into the filler neck of the gasoline vehicle is prevented. However, on the other hand, a filling pipe of a gasoline pump nozzle may nevertheless be inserted into a filler neck of a vehicle with a Diesel engine, as the inner diameter of the filler neck is large enough to insert both, the filling pipe of the Diesel pump nozzle and the filling pipe of the gasoline pump nozzle.

SUMMARY OF THE INVENTION

According to an embodiment, a misfuelling prevention device comprises a tubular element to be inserted into a filler neck of a fuel tank, an elongated support element, and a blocking element. The elongated support element can be arranged inside the tubular element. A first end of the elongated support element is coupled to the tubular element and a second end of the elongated support element and a central section of the elongated support element are spaced apart from an inner surface of the tubular element. The blocking element is arranged at the second end of the elongated support element.

According to another embodiment, a fuel tank is provided comprising a filler neck, an elongated support element, and a blocking element. The elongated support element can be arranged inside the filler neck. A first end of the elongated support element can be coupled to the filler neck and a second end of the elongated support element and a central portion of the elongated support element are spaced apart from an inner surface of the filler neck. The blocking element can be arranged at the second end of the elongated support element.

According to yet another embodiment of the present invention, a vehicle is provided. The vehicle comprises a fuel tank with a filler neck and a misfuelling prevention device. The misfuelling prevention device comprises a tubular element, an elongated support element, and a blocking element. The tubular element can be inserted into the filler neck. The elongated support element can be arranged inside the tubular element. A first end of the elongated support element can be coupled to the tubular element and a second end of the elongated support element and a central section of the elongated support element are spaced apart from an inner surface of the tubular element. The blocking element can be arranged at the second end of the elongated support element.

According to a further embodiment, a vehicle comprises a fuel tank with a filler neck, an elongated support element, and a blocking element. The elongated support element can be arranged inside the filler neck. A first end of the elongated support element can be coupled to the filler neck. A second end of the elongated support element and a central section of the elongated support element can be spaced apart from an inner surface of the filler neck. The blocking element can be arranged at the second end of the elongated support element.

Although specific features in the above summary and the following detailed description are described in connection with specific embodiments, it is to be understood that the features of the embodiments described can be combined with each other unless it is noted otherwise.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
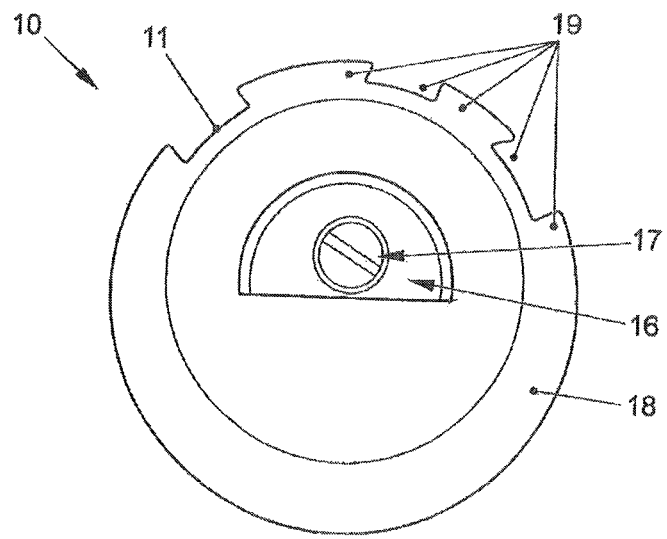
FIG. 1 shows a misfuelling prevention device according to an embodiment of the present invention.

In the following, exemplary embodiments of the invention will be described in more detail. It is to be understood that the following description is given only for the purpose of illustrating the principles of the invention and is not to be taken in a limiting sense. Rather, the scope of the invention is defined by the appended claims and not intended to be limited by the exemplary embodiments hereinafter.

It is to be understood that in the following detailed description of the several embodiments any direct connection or coupling between devices, components or other physical units shown in the drawings or described herein could also be implemented in an indirect connection or coupling. Same reference signs in the various instances of the drawings refer to similar or identical components. It is furthermore to be understood that the features of the various exemplary embodiments described herein may be combined with each other unless specifically noted otherwise.

Figure 2:
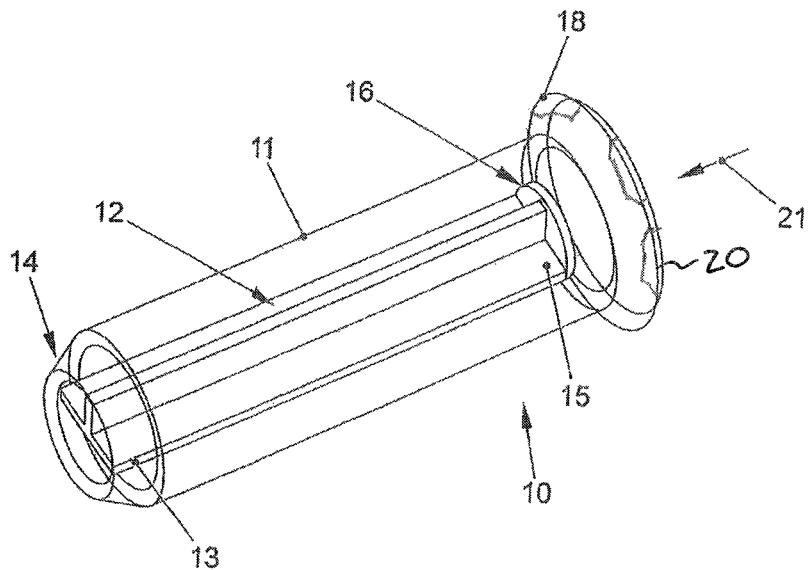
FIG. 2 shows a perspective view of a misfuelling prevention device according to an embodiment of the present invention.
Figure 3:
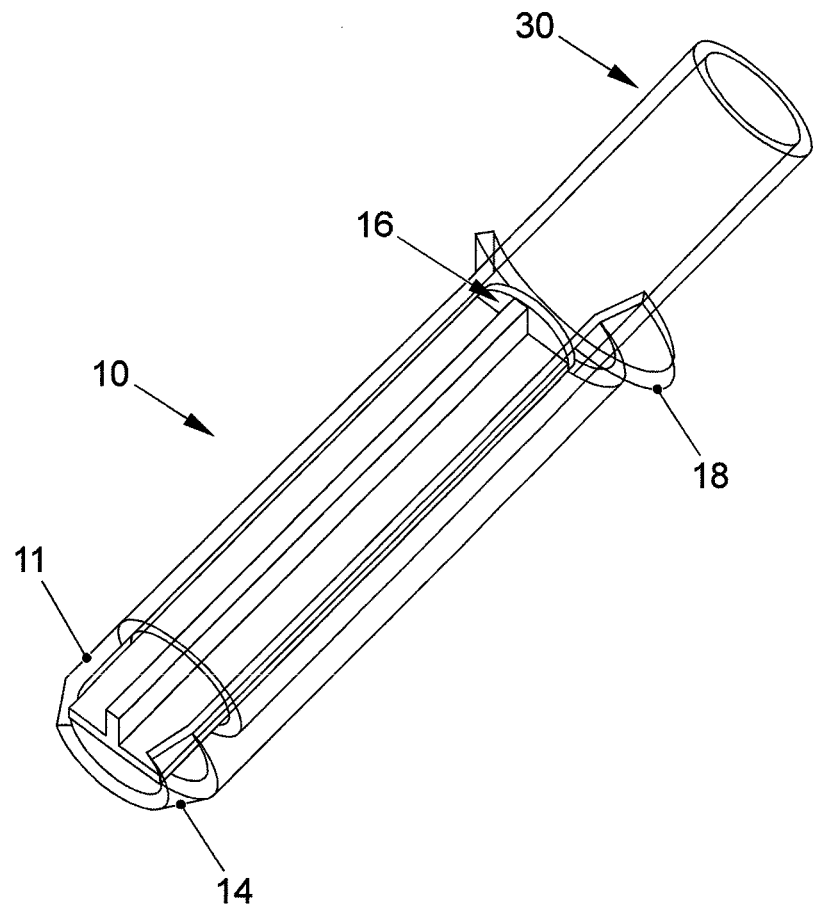
FIG. 3 shows a perspective view of a misfuelling prevention device according to an embodiment of the present invention and a filling pipe of a Diesel pump nozzle.

According to an embodiment of the present invention, a device for preventing a misfuelling, a so-called misfuelling prevention device or, for example, misfuelling inhibitor device, is provided. FIG. 2 shows a perspective schematic view of a misfuelling prevention device 10. FIG. 1 shows the misfuelling prevention device 10 of FIG. 2 viewed in the direction of arrow 21. The misfuelling prevention device 10 comprises a tubular element 11 which is made for example of a metal or a resin. Inside of the tubular element an elongated support element 12 is arranged. The elongated support element 12 may have a T-shaped cross-section in a plane perpendicular to a longitudinal direction of the elongated support element which means in a plane perpendicular to the arrow 21. The elongated support element may also be made of a metal or resin. A first end 13 of the elongated support element 12 is connected to the tubular element 11 such that it has a fixed position within the tubular element 11. For example, the first end 13 may be coupled to a tapered end 14 of the tubular element 11 via, for example, press fitting or welding or any other means known to own skilled in the art. The elongated support element 12 is arranged inside the tubular element 11 such that a second end 15 of the elongated support element 12 and a remaining part or central section of the elongated support element 12 between the first end 13 and the second end 15 are spaced apart from an inner surface of the tubular element 11. At the second end 15 of the elongated support element 12, a blocking element 16 is arranged. The blocking element 16 may have a plate shape with a surface of the plate being arranged perpendicular to the longitudinal direction of the tubular element 11 and the elongated support element 12. The plate may have a thickness in a range of 1-10 mm, preferably 3-5 mm. The plate-shaped blocking element 16 may be coupled to the second end 15 of the elongated support element 12 by, for example, welding, gluing, or any means known to one skilled in the art, or, as shown in FIG. 1, a screw 17. The plate-shaped blocking element may have a shape like a sector of a circle or like a portion of a circle as shown in FIG. 1. A dimension of the blocking element in any direction perpendicular to the longitudinal direction 21 of the elongated support element 12 is larger than an inner diameter of a filling pipe of a gasoline pump nozzle and smaller than an inner diameter of a filling pipe of a Diesel pump nozzle. Therefore, the blocking element is formed such that a filling pipe of a gasoline pump nozzle cannot be inserted into the tubular element 11 due to a collision with the blocking element 16. On the other hand, a filling pipe 30 of a Diesel pump nozzle may be inserted into the tubular element 11 as shown in FIG. 3. The filling pipe 30 of the Diesel pump nozzle (which is not shown in FIG. 3) has an inner diameter larger than a dimension of the blocking element 16 and therefore the blocking element 16 is inserted into an inside of the filling pipe 30 when the filling pipe 30 is inserted into the tubular element 11. Furthermore, the blocking element 16 is formed such that components arranged inside the filling pipe 30, for example an automatic switch-off valve, do not collide with the blocking element 16 when the Diesel pump nozzle is used in a regular orientation with respect to the misfuelling prevention device 10. A filling pipe of a gasoline pump nozzle is not only prevented from being inserted into the tubular element 11, but even when the filling pipe of the gasoline pump nozzle is abutting against the blocking element 16, a fuel flow from the gasoline pump nozzle may be disturbed such that an automatic switch-off valve of the gasoline pump nozzle automatically switches off the fuel flow.

The above-described misfuelling prevention device 10 may be inserted or installed in a filler neck of a fuel tank of a vehicle with a Diesel engine. For utilizing an installation of the misfuelling prevention device 10 in a filler neck of a fuel tank of a vehicle, the end 14 of the tubular element 11 may be tapered as described above. Furthermore, at the opposite end of the tubular element a flange 18 may be provided to support a correct installation of the misfuelling prevention device 10 in the filler neck. Furthermore, mechanical coding elements 19 may be provided as cut-outs or protrusions at the flange 18 or an outside of the tubular element 11 to be engaged with corresponding mechanical coding elements at an inside of the filler neck. Due to the mechanical coding elements 19 the tubular element 11 can be inserted into the filler neck and be engaged with the filler neck only in a predetermined position. Thus, also the blocking element 16 is arranged within the filler neck in a predetermined position such that components at an inside of the filling pipe 30 do not collide with the blocking element 16 when the pump nozzle is used in a usual orientation. The mechanical coding elements 19 may further inhibit rotating of the misfuelling prevention device 10 inside the filling neck and thus a correct position of the misfuelling prevention device 10 can be assured. Furthermore, the misfuelling prevention device 10 may comprise a locking element 20 arranged at an outside of the tubular element 11 which may be locked with a corresponding locking element at an inside of the filler neck. The locking element 20 may comprise for example a clip or a ratchet. Thus, the misfuelling prevention device 10 can be reliably installed in the filler neck. The above-described misfuelling prevention device 10 may be used as an accessory part which may be installed in a filler neck of a fuel tank of a vehicle after the vehicle has been manufactured. The misfuelling prevention device 10 may be installed by a user of the vehicle or a mechanic. Thus, even cars or vehicles which are not equipped with a misfuelling protection when they left the factory can be equipped subsequently with the misfuelling prevention device 10.

Figure 4:
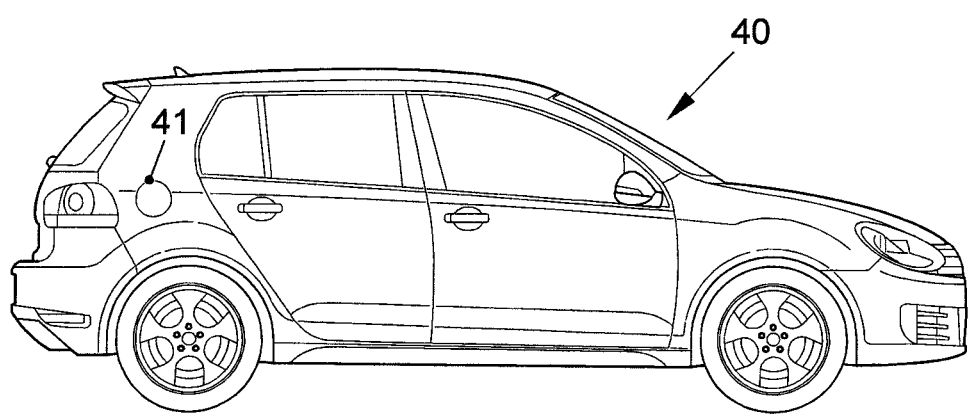
FIG. 4 shows a vehicle according to an embodiment of the present invention.

FIG. 4 shows a vehicle 40 comprising for example a Diesel engine, a fuel tank and a filler neck 41. The above-described misfuelling prevention device 10 may be inserted in the factory or subsequently after the vehicle 40 has been produced and sold into the filler neck 41.

According to another embodiment of the present invention, the elongated support element 12 may be arranged directly inside the filler neck 41. The first end 13 of the elongated support element 12 is coupled to the filler neck 41. The second end 15 of the elongated support element 12 and the central section between the first end 13 and the second end 15 of the elongated support element 12 are spaced apart from an inner surface of the filler neck 41. Furthermore, the blocking element 16 is arranged at the second end 15 of the elongated support element 12. Thus, the filler neck directly provides a misfuelling prevention without the tubular element 11.

While exemplary embodiments have been described above, various modifications may be implemented in other embodiments. For example, the blocking element 16 may be held inside of the filler neck 41 such that a filling pipe of the Diesel pump nozzle can be inserted into the filler neck, but a filling pipe of a gasoline pump nozzle cannot be inserted. For example, three struts may hold the blocking element 16 inside of the filler neck 41. The struts may be arranged comparably to the described elongated support element 12 and may be affixed at the filler neck or a fuel tank. The struts are arranged such that the fuel may pass along the blocking element and flow with a laminar flow along the struts in the tank.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A misfuelling prevention device comprising:
a tubular element configured to be inserted into a filler neck of a fuel tank;
an elongated support element arranged inside the tubular element, a first end of the elongated support element being coupled to the tubular element and a second end of the elongated support element and a central section of the elongated support element being arranged such that they are spaced apart from an inner surface of the tubular element; and
a blocking element arranged at the second end of the elongated support element, the blocking element being a plate with a surface of the plate being arranged perpendicular to a longitudinal direction of the elongated support element,
wherein the plate of the blocking element has a circumference that is a sector of a circle with an arc and a straight side that connects one end of the arc and another end of the arc, and
wherein the elongated support element includes a wide plate section and a narrow plate section extending perpendicularly from the wide plate section, thereby forming a T-shaped cross section in a plan perpendicular to the longitudinal direction of the elongated support element, and
wherein at the second end of the elongated support element, the wide plate section of the elongated support element is attached to the straight side of the blocking element, and the narrow plate section extends from the wide plate section to a center of the arc of the blocking element.

2. The misfuelling prevention device according to claim 1, wherein the elongated support element is arranged inside the tubular element such that the longitudinal direction of the elongated support element extends in a longitudinal direction of the tubular element.

3. The misfuelling prevention device according to claim 1, wherein an end of the tubular element is tapered.

4. The misfuelling prevention device according to claim 1, wherein an end of the tubular element comprises a flange.

5. The misfuelling prevention device according to claim 1, further comprising:
a flange arranged at an end of the tubular element; and
a mechanical coding element arranged on an outer circumferential area of the flange and being configured to engage with a corresponding mechanical coding element at an inner circumferential area of the filler neck, wherein due to the mechanical coding element the tubular element is insertable into and engaged with the filler neck only in a predetermined position.

6. The misfuelling prevention device according to claim 1, further comprising:
a flange arranged at an end of the tubular element; and
a locking element arranged on an outer circumferential area of the flange and being configured to be locked with a corresponding locking element at an inner area of the filler neck.

7. The misfuelling prevention device according to claim 1, wherein a diameter of the blocking element in a direction perpendicular to the longitudinal direction of the elongated support element is larger than an inner diameter of a filling pipe of a gasoline pump nozzle and smaller than an inner diameter of a filling pipe of a diesel pump nozzle.

8. A fuel tank, comprising:
a filler neck;
an elongated support element arranged inside the filler neck, a first end of the elongated support element being coupled to the filler neck, and a second end of the elongated support element and a central section of the elongated support element being configured to be spaced apart from an inner surface of the filler neck; and
a blocking element arranged at the second end of the elongated support element, the blocking element being a plate with a surface of the plate being arranged perpendicular to a longitudinal direction of the elongated support element,
wherein the plate of the blocking element has a circumference that is a sector of a circle with an arc and a straight side that connects one end of the arc and another end of the arc, and
wherein the elongated support element includes a wide plate section and a narrow plate section extending perpendicularly from the wide plate section, thereby forming a T-shaped cross section in a plane perpendicular to the longitudinal direction of the elongated support element, and
wherein at the second end of the elongated support element, the wide plate section of the elongated support element is attached to the straight side of the blocking element, and the narrow plate section extends from the wide plate section to a center of the arc of the blocking element.

9. A vehicle comprising:
a fuel tank with a filler neck; and
a misfuelling prevention device inserted into the filler neck, the misfuelling prevention device comprising:
a tubular element inserted into the filler neck;
an elongated support element arranged inside the tubular element, a first end of the elongated support element being coupled to the tubular element, and a second end of the elongated support element and a central section of the elongated support element being configured to be spaced apart from an inner surface of the tubular element; and
a blocking element arranged at the second end of the elongated support element, the blocking element being a plate with a surface of the plate being arranged perpendicular to a longitudinal direction of the elongated support element,
wherein the plate of the blocking element has a circumference that is a sector of a circle with an arc and a straight side that connects one end of the arc and another end of the arc, and
wherein the elongated support element includes a wide plate section and a narrow plate section extending perpendicularly from the wide plate section, thereby forming a T-shaped cross section in a plane perpendicular to the longitudinal direction of the elongated support element, and
wherein at the second end of the elongated support element, the wide plate section of the elongated support element is attached to the straight side of the blocking element, and the narrow plate section extends from the wide plate section to a center of the arc of the blocking element.

10. A vehicle comprising:
a fuel tank having a filler neck;
an elongated support element arranged inside the filler neck, a first end of the elongated support element being coupled to the filler neck and a second end of the elongated support element and a central section of the elongated support element are spaced apart from an inner surface of the filler neck, and a blocking element arranged at the second end of the elongated support element, the blocking element being a plate with a surface of the plate being arranged perpendicular to a longitudinal direction of the elongated support element, wherein the plate of the blocking element has a circumference that is a sector of a circle with an arc and a straight side that connects one end of the arc and another end of the arc, and wherein the elongated support element includes a wide plate section and a narrow plate section extending perpendicularly from the wide plate section, thereby forming a T-shaped cross section in a plane perpendicular to the longitudinal direction of the elongated support element, and wherein at the second end of the elongated support element, the wide plate section of the elongated support element is attached to the straight side of the blocking element, and the narrow plate section extends from the wide plate section to a center of the arc of the blocking element.

11. The misfuelling prevention device according to claim 1, wherein the filler neck of the fuel tank is adapted such that diesel fuel from a diesel pump nozzle passes to the fuel tank of a vehicle.

12. The misfuelling prevention device according to claim 1,
wherein the plate shaped blocking element has a thickness in a range of 1-10 mm.

* * * * *